United States Patent [19]

Bruner

[11] Patent Number: 4,528,857
[45] Date of Patent: Jul. 16, 1985

[54] PHASE MODULATION, ULTRASONIC FLOWMETER

[76] Inventor: Ronald F. Bruner, 1204 Red Bank Ave., Thorofare, N.J. 08086

[21] Appl. No.: 517,152

[22] Filed: Jul. 25, 1983

[51] Int. Cl.³ .............................................. G01F 1/66
[52] U.S. Cl. ............................... 73/861.18; 73/861.05
[58] Field of Search ........... 73/861.18, 861.26, 861.23, 73/861.34, 861.05, 861.06

[56] References Cited

U.S. PATENT DOCUMENTS

| | | |
|---|---|---|
| 3,357,243 | 12/1967 | Woodcock . |
| 3,631,719 | 1/1972 | Charvier et al. . |
| 3,727,458 | 4/1973 | Parkinson . |
| 3,751,979 | 8/1973 | Ims . |
| 3,818,757 | 6/1974 | Brown . |
| 3,818,877 | 6/1974 | Barrera et al. ................... 73/861.23 |
| 3,885,432 | 5/1975 | Herzl ............................. 73/861.34 X |
| 3,886,794 | 6/1975 | McShane ........................ 73/861.23 |
| 4,003,252 | 1/1977 | Dewath . |
| 4,003,256 | 1/1977 | Donelan et al. . |
| 4,011,755 | 3/1977 | Pedersen et al. . |
| 4,203,322 | 5/1980 | Brown et al. . |
| 4,240,292 | 12/1980 | Zalessky et al. . |
| 4,347,747 | 9/1982 | Srinivasan ....................... 73/861.18 |
| 4,452,089 | 6/1984 | Wada .............................. 73/861.23 |

FOREIGN PATENT DOCUMENTS

| | | | |
|---|---|---|---|
| 121780 | 9/1979 | Japan ............................. | 73/861.23 |
| 128762 | 10/1979 | Japan ............................. | 73/861.18 |
| 157662 | 12/1979 | Japan ............................. | 73/861.26 |
| 2066466 | 7/1981 | United Kingdom ............ | 73/861.18 |

Primary Examiner—James L. Rowland
Assistant Examiner—Brian R. Tumm
Attorney, Agent, or Firm—robert F. Beers; Henry Hansen; Vincent T. Pace

[57] ABSTRACT

A non-invasive ultrasonic flowmeter which utilizes the phase modulation of an ultrasonic beam transmitted through a fluid carrying conduit to determine the fluid volumetric flow rate. Transmitting and receiving transducer pairs are diametrically disposed on the outside of the conduit. The received signal is filtered, amplified and phase demodulated. In one embodiment dual loop-circuits having different carrier frequencies have their output signals combined in a differential amplifier. Instrumentation such as frequency meters or RMS voltmeters are utilized to measure either the zero-crossing frequency or amplitude, respectively, of the resulting voltage signal. Both of these quantities are nearly linearly related to the fluid flow rate.

13 Claims, 2 Drawing Figures

PHASE MODULATION, ULTRASONIC FLOWMETER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to ultrasonic flowmeters and more particularly to a noninvasive ultrasonic flowmeter which utilizes signal phase modulation to determine fluid volumetric flow rate in a closed conduit or pipe.

There are three basic categories of non-invasive ultrasonic flowmeters which are used for the measurement of average fluid flow velocity in closed conduits. These are: (1) time-differential, (2) Doppler shift, and (3) cross-correlation.

The time-differential type of flow meter employs the principle that an ultrasonic pulse travelling across the conduit with a component of its velocity along the direction of flow will traverse the conduit in slightly less time than a pulse travelling in the opposite direction, that is, with a velocity component opposing the flow direction. The time-differential type flowmeter requires very sophisticated timing circuits to measure the time intervals which in some cases may be less than a nanosecond. Furthermore, the transducers must be arranged with one upstream of the other. This arrangement introduces refraction of the ultrasonic pulse because it must pass through the conduit wall, the fluid, and the opposite wall at an oblique angle.

The Doppler-shift type of ultrasonic flowmeter utilizes the presence of traces of impurities in the fluid to scatter the incident ultrasonic signal. When the signal is thus scattered it becomes frequency shifted (i.e. Doppler-shifted) in proportion to the velocity of the scattering impurity. However, the constant of proportionality depends on the refractive angle of the transmitted ultrasonic beam.

The cross-correlation type of ultrasonic flowmeter is the only one of the three types which avoids the problems of refraction of the signal. In this type of ultrasonic flowmeter an ultrasonic beam is transmitted diametrically through the conduit and fluid by transducer pairs at each of two locations separated by a distance L. The disturbances caused to the transmitted beams by fluid turbulence and inhomogeneities are obtained by phase demodulation of the received signal. The time delayed upstream signal is then cross-correlated with the downstream signal as a function of the delay time T. The delay for which the cross-correlation is a maximum is taken as a measure of the time required for turbulent fluctuations to be convected the distance L between the pairs of ultrasonic transducers. The flow velocity is then computed as L/T.

Although the cross-correlation type avoids the problems associated with refraction of the ultrasonic beam, it utilizes very complex circuits which make it more expensive than either of the other two types. Also, the complex circuitry required hinders the development of small, portable units for survey use.

SUMMARY OF THE INVENTION

Accordingly, one object of this invention is to measure the volumetric flow rate of turbulent fluids in an enclosed conduit.

Another object of this invention is to determine fluid flow rate from the phase modulation of ultrasonic signals transmitted through the fluid carrying conduit.

A further object of this invention is to minimize refraction of the ultrasonic beam as it is transmitted through the fluid carrying conduit.

A still further object of this invention is to transmit the ultrasonic beam diametrically across the fluid bearing conduit.

Another object of this invention is to measure fluid flow rate using simpler and less expensive equipment and circuitry than current ultrasonic flowmeters.

Still another object of this invention is to be suitable for portable survey use.

A still further object of this invention is to be adaptable for use over a wide range of conduit sizes, material and wall thicknesses without requiring circuit modifications.

The above and other objects are accomplished by the subject invention with two sets of transmitting and receiving transducers externally attached to a fluid carrying conduit. The transducer sets are located adjacent each other while the respective transmitting and receiving transducers are positioned diametrically opposite each other.

Ultrasonic beams are transmitted through the conduit by the transmitting transducers in anti-parallel directions. The frequency of each beam is different from the other, and as the beams traverse the conduit they are phase modulated by turbulence in the fluid flow. The phase modulated signals are picked up by the receiving transducers and are then filtered, amplified, and synchronously phase demodulated.

The two signals are then amplitude balanced and combined in a differential amplifier, the output of which is bandpass filtered. This results in a signal which is related to the fluid flow rate with respect to either its RMS amplitude or its mean frequency of zero crossings depending on the structure and upstream components of the conduit. Either of these quantities may be measured by appropriate instruments which can be calibrated to indicate the fluid flow rate. An alternative embodiment uses a single loop to accomplish the same results.

Other objects, advantages, and novel features of the invention will become apparent from the detailed description of the invention which follows the accompanying drawings wherein:

DETAILED DESCRIPTION OF THE INVENTION

Figure 1:
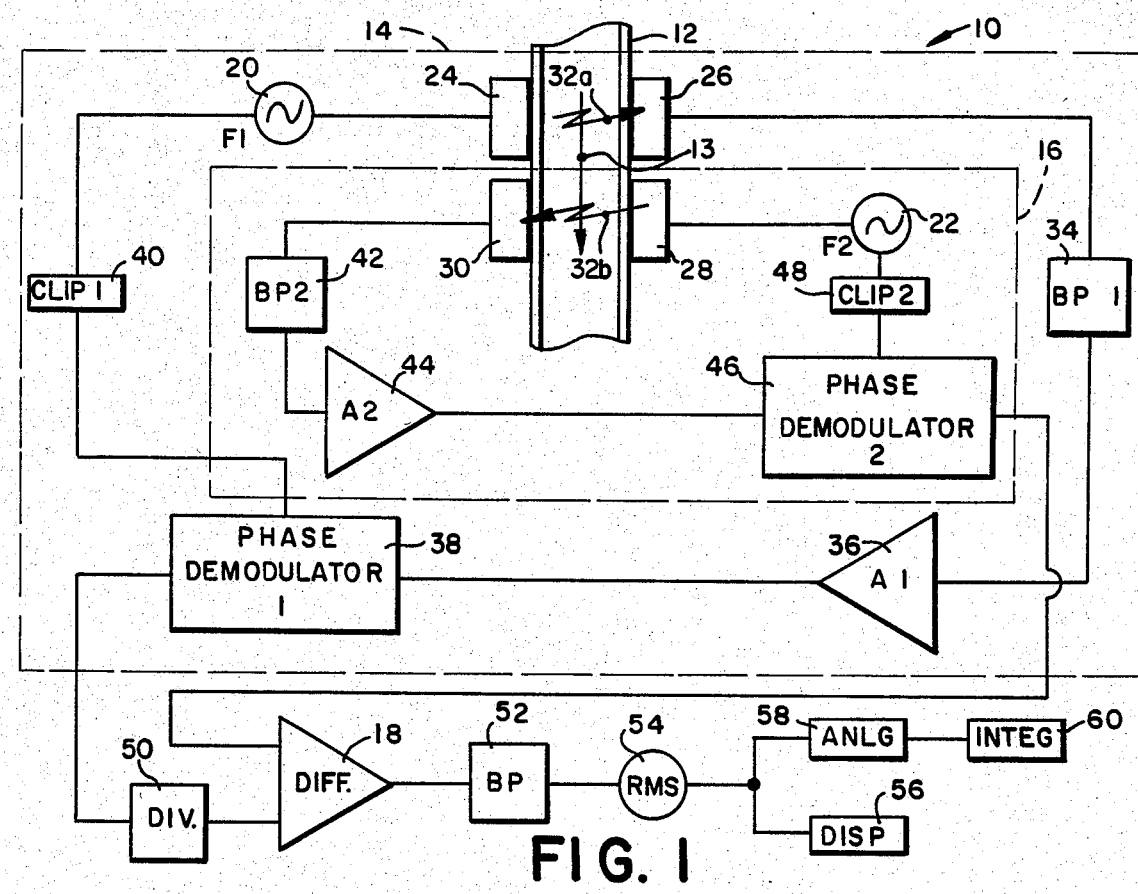
FIG. 1 is a block diagram of a dual loop phase modulation amplitude ultrasonic flowmeter which represents one emmbodiment of the subject invention.

Referring now to the drawings, and in particular to FIG. 1, there is shown generally, and in block diagram form, a phase modulation ultrasonic flowmeter 10. This embodiment of the subject invention has two loop-circuits 14 and 16, designated by the dashed lines. The two loop-circuits 14 and 16 have similar components but operate at different frequencies.

Loop-circuit 14 has a transmitting transducer 24 and a receiving transducer 26 attached externally to a conduit 12. The conduit 12 carries a fluid having a mean flow in the direction indicated by the arrow 13. The transmitting transducer 24 and receiving transducer 26 are located diametrically across the conduit from each other.

The transmitting transducer 24 is driven to transmit an ultrasonic beam 32a through the conduit 12 by means of tunable signal generator 20. The tunable signal generator 20 in the embodiment of FIG. 1 may be realized by use of an oscillator tuned to frequency F1.

Loop-circuit 16 also has a tunable signal generator 22 which produces an ultrasonic signal of frequency F2 different from F1. It is necessary that the signal generators 20 and 22 be tunable within a narrow frequency band in order to maximize the transmitted signal for various pipe diameters. For example, for a tuned frequency of 2 MHz a variation of ±5–6 kHz may be desirable. The range would vary, however, based on the selected center frequency. The tunable signal generator 22 drives a transmitting transducer 28 to transmit an ultrasonic beam 32b through the conduit 12 in an anti-parallel direction to ultrasonic beam 32a. This ultrasonic beam 32b is picked up by a receiving transducer 30 which is also mounted externally to the conduit 12, diametrically across from the transmitting transducer 28.

The ultrasonic beams 32a and 32b are transmitted in anti-parallel directions in order to reduce the sensitivity of the flowmeter 10 to temperature or pressure inhomogeneities.

The relative positions of the two pairs of transducers 24, 26 and 28, 30 are not critical for the elimination of pressure pulsation noise. Different relative positions than shown in FIG. 1, however, could alter the flowmeter calibration and make it sensitive to temperature inhomogeneities in the fluid. To further reduce the sensitivity to such temperature inhomogeneities, the positions of transmitting transducer 28 and receiving transducer 26 may be interchanged.

It is important that the transducer pairs 24,26 and 28,30 each have the receiver located essentially diametrically opposite the transmitter. This arrangement avoids refraction of the ultrasonic beams 32a and 32b, thus permitting non-invasive operation which is effectively insensitive to the relative index of refraction between the conduit material and the particular fluid. Also, diametral transmission eliminates the generation of vibrations which propagate axially along the conduit and which can be reflected from flanges, joints, etc. to interfere with the primary ultrasonic beam.

The receiving transducers 26 and 30 are designed to resonate at frequencies F1 and F2 respectively. The ultrasonic beams 32a and 32b are phase modulated by turbulence in the fluid flow in going from the transmitting transducers 24 and 28 to the receiving transducers 26 and 30 respectively. The phase modulation of the beam is attributable to those components of the instantaneous fluid velocity which are transverse to the mean flow direction. The receiving transducers 26 and 30 then transmit the received signals to respective band-pass filters 34 and 42. These filters have sufficiently narrow bandwidths about their respective frequencies F1 and F2 to eliminate cross-talk between the two-loop circuits 14 and 16. That is to say, band-pass filter 34 has a bandwidth which excludes frequency F2 and frequencies within a desired range thereof, and band-pass filter 42 has a bandwidth which excludes frequency F1 and frequencies within a desired range thereof.

The filtered signals are then amplified by respective limiting preamplifiers 36 and 44. These preamplifiers, 36 and 44, also symmetrically clip the amplified signals to a square wave having equal positive and negative amplitudes which are suitable for input to phase demodulation circuits 38 and 46 respectively. The phase demodulation circuits 38 and 46 may be realized by balanced quadrature detectors or similar devices.

The gains of the preamplifiers 36 and 44 are determined with regard to the sensitivity of the receiving transducers 26 and 30 and the sensitivity of the phase demodulation circuits 38 and 46 respectively. A major criterion is that the amplified signal have a steep enough slope at the zero crossings so that when it is clipped it will closely approximate a square wave. For most practical applications the gain may be on the order of 60 db or more.

Also, the preamplifiers 36 and 44 should be capable of limiting the amplified signal to approximately ±1.5 volts. However, this value can range between ±150 millivolts and ±3 volts, or possibly more, depending on the input sensitivity of the phase demodulation circuits 38 and 46.

In conjunction with the phase demodulation circuits 38 and 46, a portion of the transmitted tuned frequency signals from signal generators 20 and 22 are sent to clipper-limiter circuits 40 and 48 respectively. The signals are symmetrically clipped to square waves which are then input to phase demodulation circuits 38 and 46 respectively. These signals serve as synchronization or reference signals for the phase demodulators 38 and 46.

The output signals from phase demodulators 38 and 46 are then input to a differential amplifier 18. However, because the amplitudes of the demodulated signals are proportional to the frequencies of their respective loop-circuits, there must be some means for balancing the difference between the two signals. In the embodiment shown in FIG. 1, this is accomplished by means of a voltage divider circuit 50 connected to the output of phase demodulator circuit 14. The voltage divider 50 has a multiplication factor approximately equal to the ratio F2/F1.

Alternatively, the voltage divider 50 could be connected to the output of phase demodulator circuit 46. In that case the multiplication factor would be approximately equal to the ratio F1/F2. In the preferred embodiment, the voltage divider 50 would be connected in the loop-circuit having the higher frequency input signal. Equivalently, the output signals of the phase demodulators 38 and 46 may be balanced by amplifying the output of the phase demodulation circuit with the lower frequency input signal. The gain would be approximately equal to the ratio of the higher frequency to the lower frequency.

Differential amplifier 18 effectively cancels out those portions of the demodulated signals which are due to sources other than transverse fluid flow components. Since the ultrasonic beams 32a and 32b are transmitted in anti-parallel directions, the phase modulations of each beam attributable to transverse fluid flow components will have equal magnitudes but opposite signs with respect to each beam. The amplitudes of the two demodulated signals are effectively added together in the differential amplifier 18 because signals of opposite sign are being subtracted one from the other. Thus, the amplitude of the phase modulations due to transverse velocity components is effectively doubled.

Temperature and pressure inhomogeneities are effectively scalar quantities since they have no direction relative to the ultrasonic beams. Phase modulations due to these components will have the same sign for both beams. The amplitudes of these components are effectively cancelled when the demodulated signals are subtracted one from the other in differential amplifier 18. Consequently, the flowmeter 10 is less sensitive to temperature or pressure anomalies in the fluid.

The output signal of the differential amplifier 18 is then input to band-pass filter 52. Band-pass filter 52 will generally have a bandwidth of approximately 5–20 Hz depending on the particular application.

The output signal of bandpass filter 52 is a voltage signal having zero mean value and an RMS value which is a highly linear function of the volumetric fluid flow rate in the conduit. An RMS voltmeter 54 may be connected to the output of bandpass filter 52. RMS voltmeter 54 has a sufficiently long measurement period to obtain a good average reading. This measurement period is generally in the range of 4–40 seconds. The flow rate can then be determined as a function of the reading of the RMS voltmeter 54.

A display unit 56 may be connected to the RMS voltmeter 54 to give a digital or scaled readout of the fluid flow rate. Additionally, analog output 58 and an integrator 60 may be desirable alternative outputs depending on the application.

In an alternative embodiment of the subject invention a frequency meter is substituted for the RMS voltmeter 54. The frequency meter counts the number of zero crossings of the output signal of the band-pass filter 52 during a time period sufficiently long to obtain an accurate measure of the average frequency of zero crossings.

It has been determined that the average frequency with which turbulent fluid flow modulates the transmitted ultrasonic beam, and hence, the average frequency of the zero crossings of the phase demodulated signal varies in proportion to the average velocity of fluid flow for sufficiently large Reynolds number. The Reynolds number for this embodiment would typically be on the order of $10^4$ or larger for most industrial applications.

The constant of proportionality for each of these embodiments will be different for different widths of the conduit. In the RMS voltmeter embodiment it will depend heavily on the speed of sound in the particular fluid. It also may have slight dependence on Reynolds number, pipe wall roughness and ultrasonic beam diameter. Thus, the specific value of the proportionality constant may not be predicted theoretically and must be obtained empirically or by direct calibration of the flowmeter.

Figure 2:
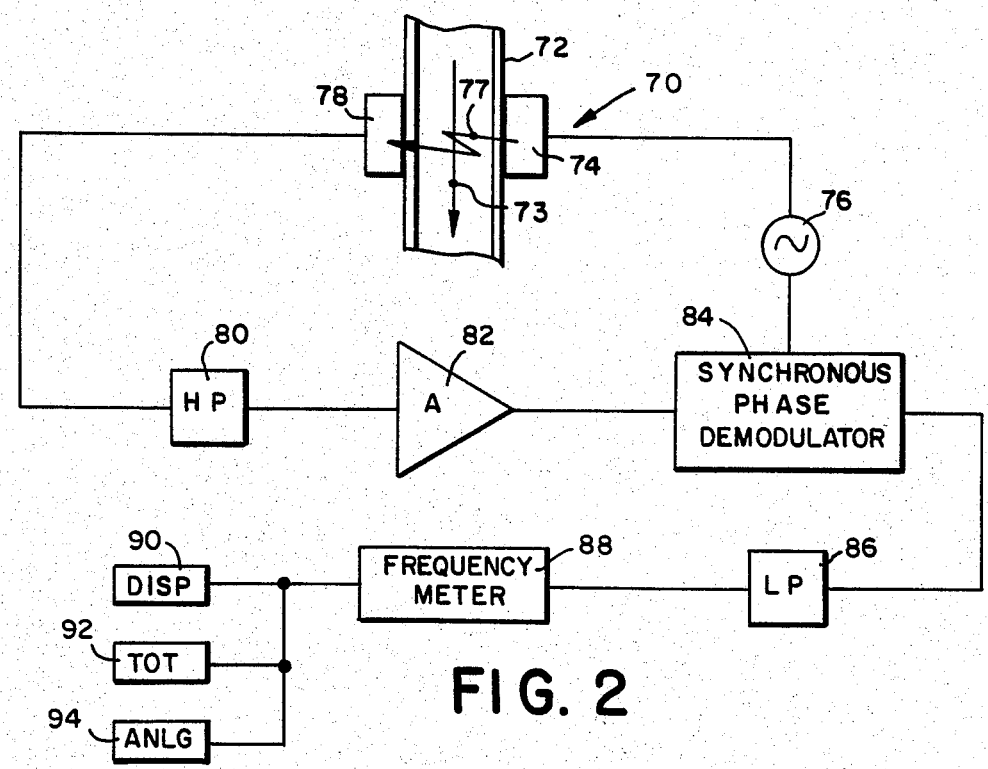
FIG. 2 is a block diagram of a single loop phase modulation frequency ultrasonic flowmeter which represents an alternative embodiment of the subject invention.

FIG. 2 illustrates another possible embodiment of the phase modulation ultrasonic flowmeter. In this embodiment a transmitting transducer 74 is externally attached to a fluid carrying conduit 72. The direction of the mean fluid flow in the conduit is indicated by arrow 73.

Transmitting transducer 74 is driven to transmit an ultrasonic beam 77 through the walls of conduit 72 and the fluid. The ultrasonic signal, which has frequency F, is generated by a signal generator 76, which may be realized by a tunable oscillator.

As the ultrasonic beam 77 traverses the conduit 72 it is phase modulated by turbulence in the fluid flow as in the previously described embodiment. The phase modulated beam is then picked up by receiving transducer 78 which is designed to resonate at frequency F and which is located diametrically across from transmitting transducer 74.

A high-pass filter 80 is connected to receiving transducer 78 in order to eliminate undesirable low frequency noise due to flow turbulence or other sources. The filtered, phase modulated signal is then amplified by means of amplifier 82 and input to a phase demodulator circuit 84. The phase demodulator circuit is synchronized by receiving a portion of the input signal from the signal generator 76.

The phase demodulated output of demodulator circuit 84 goes through a low-pass filter 86 so that only those phase modulations of the received signal which are much lower in frequency than the input signal are passed. Since there is no means for cancelling out phase modulations due to temperature or pressure inhomogeneities, this embodiment is more sensitive to such variables.

The output of the low-pass filter 86 is a filtered, phase demodulated, time varying signal having zero mean value and a mean zero crossing frequency which is a nearly linear function of the flow rate of the fluid in the conduit 72. As previously described, the output signal can be analyzed by a frequency meter 88 which measures the average frequency of the zero crossings of the output signal. Frequency meter 88 has a sufficiently long measurement period to obtain a good average reading. The measurement period is generally in the range of 4–40 seconds.

A display unit 90 can be connected to the frequency meter 88 to visually indicate the flow rate. A totalizer 92 or analog device 94 can also be connected to the frequency meter 88 to provide alternative outputs.

Also, in place of the frequency meter 88, an RMS voltmeter could be utilized as described previously since the low-pass filter 86 output would also have a measurable RMS amplitude.

The embodiments of the subject invention disclosed herein are suitable for packaging as portable units. However, the invention could also be installed as a fixed, dedicated flowmeter system. Such an embodiment would avoid transducer alignment and "around-the-wall" transmission problems where a permanent installation is desirable.

Also, the invention could be produced without the frequency meter or RMS voltmeter since such devices are commonly available on the open market.

Numerous modifications and variations of the subject invention are possible in light of the above teachings. It is therefore to be understood that within the scope of the appended claims the invention may be practiced otherwise than as specifically described.

What is claimed is:

1. An apparatus for measuring the volumetric flow rate of a fluid in a closed conduit having turbulent flow comprising:
   two loop-circuits each including:
   a transmitting transducer formed to be attached externally to to a fluid carrying conduit;
   a tunable oscillator for supplying an ultrasonic signal to be transmitted through said conduit by said transmitting transducer, said tunable oscillator being tuned to a higher frequency for one of said loop-circuits than for the other;

a receiving transducer formed to be attached externally to said conduit at a point diametrically opposite said transmitting transducer, for receiving the ultrasonic signal transmitted by said transmitting transducer, said first and second transducers in each loop-circuit being arranged such that their respective ultrasonic signals are transmitted in anti-parallel directions through said conduit;

a bandpass filter connected to said receiving transducer;

a limiting preamplifier for amplifying and symmetrically clipping the output signal of said bandpass filter;

a phase demodulating circuit connected to said limiting preamplifier;

a clipping circuit connected to said tuned oscillator and said phase demodulating circuit for supplying a symmetrically clipped synchronizing signal to said phase demodulation circuit;

a voltage divider connected to the output of the phase demodulation circuit in the loop-circuit having the higher frequency, for balancing the amplitude difference between the output signals of said loop-circuits;

a differential amplifier connected to the balanced outputs of said loop-circuits;

an output bandpass filter connected to the output of said differential amplifier, whereby a demodulated, filtered, and time-varying signal having zero mean value is produced which is related to fluid flowrate with respect to its RMS amplitude; and an RMS voltmeter for measuring the RMS value of the amplitude of said demodulated, filtered, time-varying signal.

2. An apparatus for measuring fluid flow rate as recited in claim 1 wherein said exciting means comprises tunable electronic oscillators each tuned to different ultrasonic frequencies.

3. An apparatus for measuring fluid flow rate as recited in claim 2 wherein said combining and phase demodulation means comprises:

a phase demodulation circuit connected to the output of said limiting preamplifier means for symmetrically clipping a portion of the signal generated by said electronic oscillators and operatively connected to said phase demodulation circuit whereby a synchronizing signal is supplied to said phase demodulation circuit;

means for balancing amplitude differences between the output signals of said loop circuits; and a differential amplifier operatively connected to said amplitude balancing means for combining the balanced output signals from said loop circuits.

4. An apparatus for measuring fluid flow rate as recited in claim 3 wherein said amplitude balancing means comprises a voltage divider circuit connected in the loop-circuit having the higher tuned frequency, said voltage divider circuit being connected after said phase demodulation circuit and ahead of said differential amplifier.

5. An apparatus for measuring fluid flow rate as recited in claim 4 further comprising means for measuring the RMS value of the amplitude of the demodulated, filtered, time-varying signal.

6. An apparatus for measuring fluid flow rate as recited in claim 5 wherein the amplitude RMS value measurement means comprises an RMS voltmeter.

7. An apparatus for measuring fluid flow rate as recited in claim 6 wherein the RMS voltmeter has a measurement period in the range of 4 to 40 seconds.

8. An apparatus for measuring fluid flow rate as recited in claim 4 further comprising means for measuring the mean frequency of zero-crossings of the demodulated, filtered, and time-varying signal.

9. An apparatus for measuring fluid flow rate as recited in claim 8 wherein the zero-crossing frequency measurement means comprises a frequency meter.

10. An apparatus of measuring fluid flow rate as recited in claim 9 wherein the frequency meter further comprises means for displaying a numerical readout of an average of the zero-crossing frequency.

11. An apparatus for measuring fluid flow rate as recited in claim 10 wherein the frequency meter has a measurement period in the range of 4 to 40 seconds.

12. An apparatus for measuring fluid flow rate as recited in claim 4 wherein said first loop-circuit transducers are located adjacent to the second loop-circuit transducers on the fluid carrying conduit.

13. An apparatus for measuring the volumetric flow-rate of a fluid in a closed conduit having turbulent flow, said apparatus comprising:

means for exciting ultrasonic transducers to transmit ultrasonic signals at preselected frequencies;

a pair of loop-circuits each including:

a transmitting transducer formed to be attached externally to the conduit and operatively connected to said exciting means;

a receiving transducer formed to be attached externally to the conduit at a point diametrically opposite said transmitting transducer for receiving the ultrasonic signal transmitted by said transmitting transducer, said transmitting and receiving transducers in each loop-circuit being arranged such that their respective ultrasonic signals are propagated in anti-parallel directions through the conduit;

a bandpass filter operatively connected to said second transducer for passing a preselected band of frequencies about the frequency of the ultrasonic signal received by said second transducer; and a limiting preamplifier operatively connected to said bandpass filter for amplifying and symmetrically clipping the output signal of said bandpass filter;

means for combining and phase demodulating the output signals from said loop circuits; and a second bandpass filter operatively connected to said combining and phase demodulating means for passing a preselected band or frequencies, whereby a demodulated, filtered, and time-varying signal having zero mean value is produced which is linearly related to fluid flow velocity with respect to either its RMS amplitude or mean zero-crossing frequency.

* * * * *